United States Patent

Takagi et al.

[11] Patent Number: 5,859,909
[45] Date of Patent: *Jan. 12, 1999

[54] PORTABLE TELEPHONE HAVING A BIASED ROTATABLE COVER

[75] Inventors: Hisamitsu Takagi, Inagi, Japan; Hideharu Suzuki, Dallas, Tex.; Masashi Tomura, Setagaya-ku; Akihide Nishiyama, Yokohama, both of Japan

[73] Assignee: Fujitsu Limited, Kawasaki, Japan

[ * ] Notice: The term of this patent shall not extend beyond the expiration date of Pat. No. 5,692,045.

[21] Appl. No.: 807,697

[22] Filed: Feb. 28, 1997

Related U.S. Application Data

[63] Continuation of Ser. No. 434,121, May 2, 1995, Pat. No. 5,692,045, which is a continuation of Ser. No. 334,006, Nov. 2, 1994, abandoned, which is a continuation of Ser. No. 54,019, Apr. 29, 1993, abandoned, which is a continuation of Ser. No. 773,644, filed as PCT/JP91/00253 Feb. 26, 1991, Pat. No. 5,257,310.

[30] Foreign Application Priority Data

Feb. 27, 1990 [JP] Japan ............................................ 44641
Aug. 7, 1990 [JP] Japan .......................................... 207596

[51] Int. Cl.⁶ ...................................................... H04M 1/00
[52] U.S. Cl. ............................................ 397/433; 379/434
[58] Field of Search .................................... 379/433, 434, 379/428; 455/90, 575, 128, 347, 351; 16/386, 388, 374, 375, 319, 327, 262, 263, 380, 303

[56] References Cited

U.S. PATENT DOCUMENTS

| | | |
|---|---|---|
| 2,960,296 | 11/1960 | Sepp, Jr. . |
| 3,001,033 | 9/1961 | Rosenblum ............................. 379/452 |
| 3,325,854 | 6/1967 | Steigerwald . |
| 3,911,529 | 10/1975 | Pringle . |
| 4,831,655 | 5/1989 | Beuttner . |
| 4,845,772 | 7/1989 | Metroka et al. . |
| 4,897,873 | 1/1990 | Beutler et al. . |
| 5,014,346 | 5/1991 | Phillips et al. . |
| 5,027,394 | 6/1991 | Ono et al. . |
| 5,111,503 | 5/1992 | Takagi ..................................... 379/433 |
| 5,257,310 | 10/1993 | Takagi et al. . |

FOREIGN PATENT DOCUMENTS

| | | |
|---|---|---|
| 61-7145 | 1/1986 | Japan . |
| 63-86929 | 4/1988 | Japan . |
| 63-146648 | 6/1988 | Japan . |
| 63-147051 | 9/1988 | Japan . |
| 63-237648 | 10/1988 | Japan . |
| 63-240244 | 10/1988 | Japan . |
| 1125027 | 5/1989 | Japan . |

*Primary Examiner*—Jack Chiang
*Attorney, Agent, or Firm*—Stass & Halsey

[57] ABSTRACT

A portable telephone having a cover (14) rotatably mounted to a cover body (2). When the cover (14) is in a closed condition, it covers and protects a switch section of the body (2), while when the cover (14) is in an open condition, it is held in a stable position at a predetermined inclined angle with respect to the body (2) by a cover holding mechanism. When the cover (14) is in the open condition, it also functions as a voice reflecting and collecting board for a microphone provided in the body (2).

3 Claims, 5 Drawing Sheets

PORTABLE TELEPHONE HAVING A BIASED ROTATABLE COVER

This application is a continuation of application Ser. No. 08/434,121, filed May 2, 1995, now U.S. Pat. No. 5,692,045 which is a continuation of application Ser. No. 08/334,006, filed Nov. 2, 1994, now abandoned, which is a continuation of application Ser. No. 08/054,019, filed Apr. 29, 1993, now abandoned, which is a continuation of application Ser. No. 07/773,644, filed as PCT/JP91/00253 Feb. 26, 1991, U.S. Pat. No. 5,257,310.

TECHNICAL FIELD

The present invention relates generally to a portable telephone, and more particularly to the structure of a case of a portable telephone having a cover. In the following description, it is to be noted that the term portable telephone used herein also includes a general cordless telephone.

BACKGROUND ART

An ultimate object of communication is, of course, to enable information to be transmitted or exchanged at once anytime, from anywhere, and by anybody. In addition to conventional intercommunication between fixed points, mobile communication has been gradually developed. Mobile communication means a communication between a mobile body such as ship, automobile, or airplane (including a human being) and a fixed point such as home or office, and also means an intercommunication between two mobile bodies. In recent years, a portable telephone or a cordless telephone as a kind of means for carrying out the mobile communication has been extensively developed.

In general, a telephone is used with a receiver section put to the ear and a transmitter section kept near the mouth. So also in a portable telephone, it is necessary to ensure a sufficient distance between the receiver section and the transmitter section. In this circumstance, a conventional portable telephone itself is relatively long and large in size.

A portable telephone having a foldable cover for protecting a switch section of the portable telephone is known. In this portable telephone, a microphone is provided in the cover so as to ensure a sufficient distance between a speaker and the microphone.

In the above described conventional portable telephone, the distance between the receiver section and the transmitter section, both provided in a telephone body, is set to be substantially equal to the distance between the ear and the mouth of a user. Accordingly, such portable telephone cannot be made sufficiently compact. A manufacturing technology for parts constituting the portable telephone has been advanced to supply compact and inexpensive parts. In this viewpoint only, a compact portable telephone can be manufactured relatively easily. However, since there exists a human engineering demand that the distance between the receiver section and the transmitter section should be substantially equal to that between the ear and the mouth, this demand causes a hindrance in practically manufacturing a compact portable telephone.

Further, in the conventionally proposed portable telephone having a foldable cover, since the microphone is provided in the cover, a microphone cord is liable to break due to repeated opening and closing operation of the cover.

It is accordingly an object of the present invention to provide a portable telephone which can ensure a sufficient distance between the receiver section and the transmitter section during telephonic communication regardless of the compact construction of the telephone body.

It is another object of the present invention to provide a portable telephone which can protect the switch section in an inoperative condition and improve an S/N characteristic in the transmitter section when in an operative condition.

DISCLOSURE OF THE INVENTION

According to the present invention, there is provided a portable telephone comprising a body including a speaker, a microphone, and switch means; a cover rotatably mounted to said body, said cover covering at least said switch means when said cover is in a closed condition; and cover holding means for rotatably holding said cover with respect to said body, said cover holding means including biasing means for exerting a biasing force to said cover so as to maintain said cover at a stable position in a rotational direction when said cover is in an open condition.

Preferably, the cover holding means comprises a cover mounting projection integrally formed with said body and having a pair of holes; a pair of shafts rotatably inserted through said holes, respectively, each of said shafts having one end fixed to said cover and having a plate portion formed near its other end; and a pair of U-shaped springs fixed to said body so as to respectively nip said plate portions of said shafts.

In using the portable telephone, when the cover is opened, it is held in a stable position where the cover is inclined at a predetermined angle (e.g., 145°) with respect to the body by the cover holding means. In this stable position, the cover also functions as a voice reflecting and collecting board.

BEST MODE FOR CARRYING OUT THE INVENTION

Figure 1:
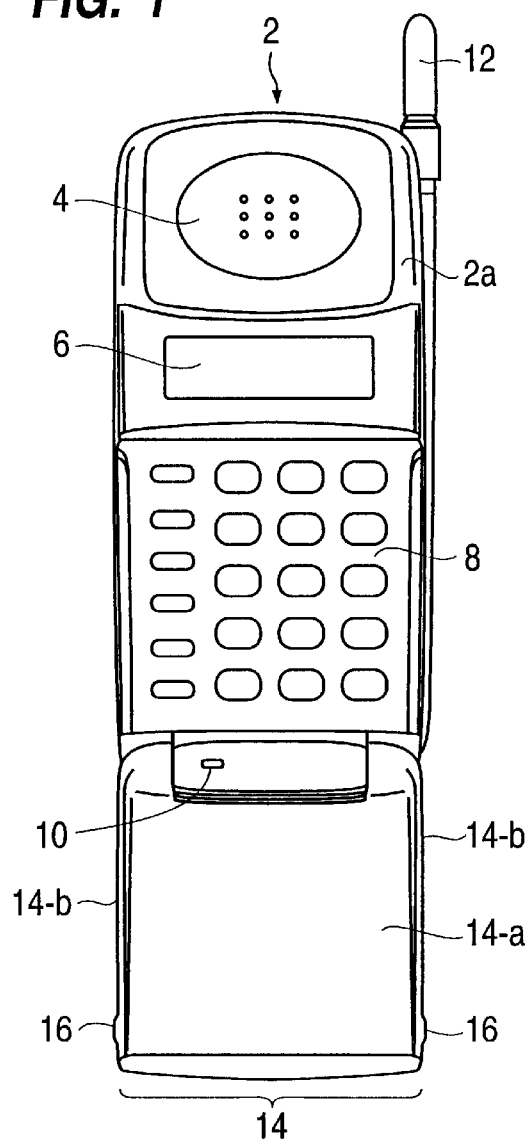
FIG. 1 is a plan view of a portable telephone according to a preferred embodiment of the present invention.
Figure 2:
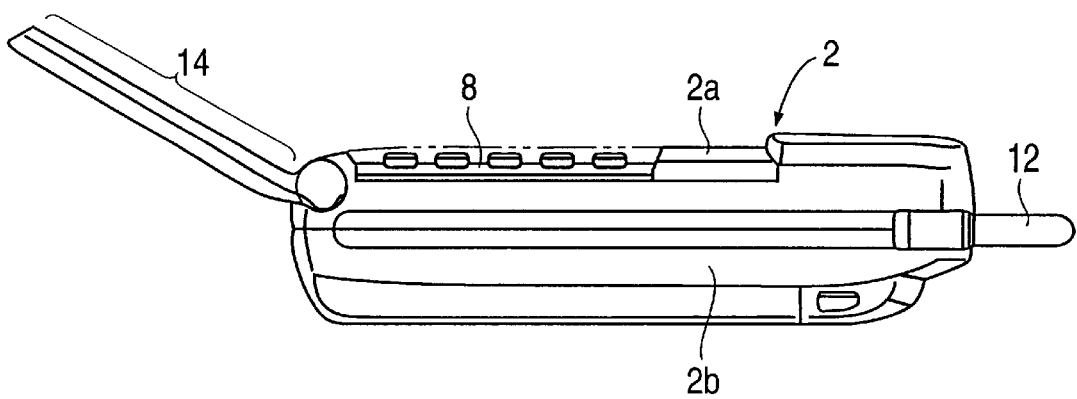
FIG. 2 is a side view of FIG. 1.

There will first be described a schematic arrangement of the portable telephone of the present invention with reference to FIGS. 1 and 2. In FIGS. 1 and 2, there is shown an open condition of a cover of the portable telephone. A case 2 of the portable telephone is comprised of an upper case 2a and a lower case 2b. A receiver section 4 accommodating a speaker therein is provided at an upper end portion of the case 2. A display section 6 such as a liquid crystal display and a switch section 8 having a dialing function or the like are provided at a middle portion of the case 2. A transmitter section 10 accommodating a microphone therein is provided at a left end of a lower end portion of the case 2. The reason why the transmitter section 10 is provided at the left end of the lower end portion of the case 2 rather than at the center of the lower end portion of the case 2 is that the distance between the receiver section 4 and the transmitter section 10 is intended to be made as large as possible in such a compact case 2.

Reference numeral 12 denotes an antenna extendably provided at a side portion of the case 2. A cover 14 is rotatably mounted in the vicinity of the lower end portion of the case 2. As clearly shown in FIGS. 1–3, the cover 14 comprises a top cover 14-a and opposed side covers 14-b. The side covers 14-b extend generally perpendicular to the top cover 14-a. The cover 14 functions to cover at least the switch section 8 when it is in a closed condition, while functioning as a voice reflecting and collecting board for the transmitter section 10 when it is in an open condition. The cover 14 has a shallow concave portion formed in the inside face thereof to facilitate voice reflecting and collecting and a projection 16 formed on each side cover 14-b to facilitate opening and closing of the cover. While the cover 14 is rotatably mounted to the case 2 as mentioned above, it is stably held in position inclined at a predetermined angle with respect to the case 2 by means of a cover holding mechanism which will be hereinafter described.

Figure 3:
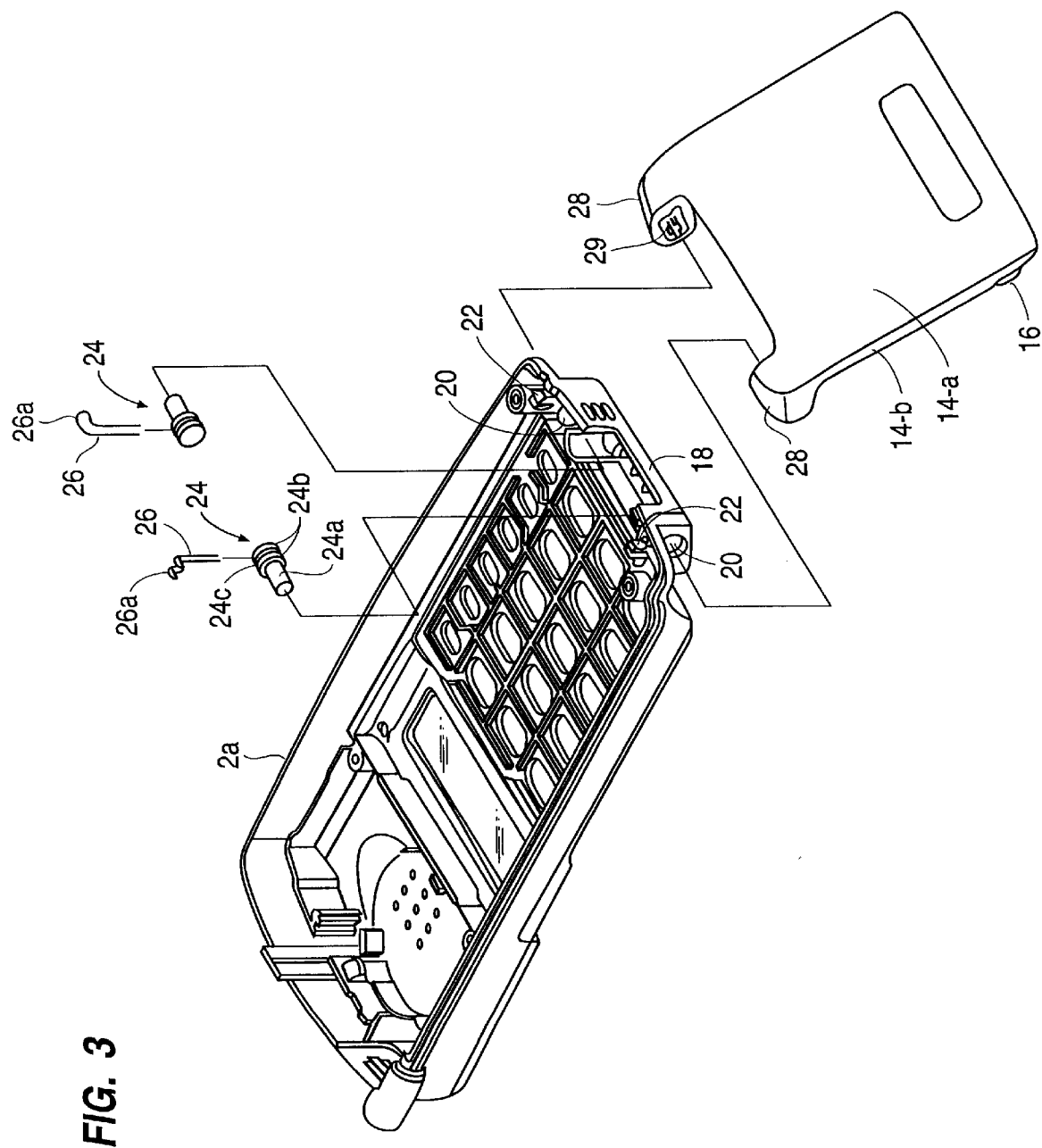
FIG. 3 is an exploded perspective view showing a first preferred embodiment of a cover holding mechanism according to the present invention.

FIG. 3 is an exploded perspective view of a first preferred embodiment of the cover holding mechanism, and shows a condition where the upper case 2a is viewed from its back side. The upper case 2a is integrally formed at its lower end with a cover mounting projection 18 having a pair of circular holes 20 at opposite ends thereof. The upper case 2a is further formed with a pair of projections 22 adapted to respectively engage a pair of U-shaped springs 26 which will be hereinafter described.

Reference numerals 24 denote a pair of shafts for rotatably mounting the cover 14 to the upper case 2a. Each shaft 24 is formed at its one end with a mounting portion 24a. On the other hand, the cover 14 is integrally formed with a pair of mounting projections 28 each having a hole 29. The mounting portions 24a of the shafts 24 are adapted to be press-fitted into the holes 29 of the mounting projections 28 of the cover 14. Further, each shaft 24 is formed at its other end with a pair of annular lands 24b. Between both the annular lands 24b, there is formed an angular plate portion 24c for stably holding the cover 14 at a predetermined inclined angle with respect to the upper case 2a. The angular plate portions 24c of the shafts 24 are adapted to respectively engage the U-shaped springs 26 each having a bent portion 26a at one end thereof.

The cover 14 is mounted to the upper case 2a in the following manner. First, the holes 29 of the cover 14 are aligned to the holes 20 of the upper case 2a, and the mounting portions 24a of the shafts 24 are inserted through the holes 20 of the upper case 2a and press-fitted into the holes 29 of the cover 14. Then, the U-shaped springs 26 are brought into engagement with the angular plate portions 24c of the shafts 24, and the bent portions 26a of the U-shaped springs 26 are brought into engagement with the projections 22 of the upper case 2a. Thus, the cover 14 is rotatably mounted to the upper case 2a.

Figure 4:
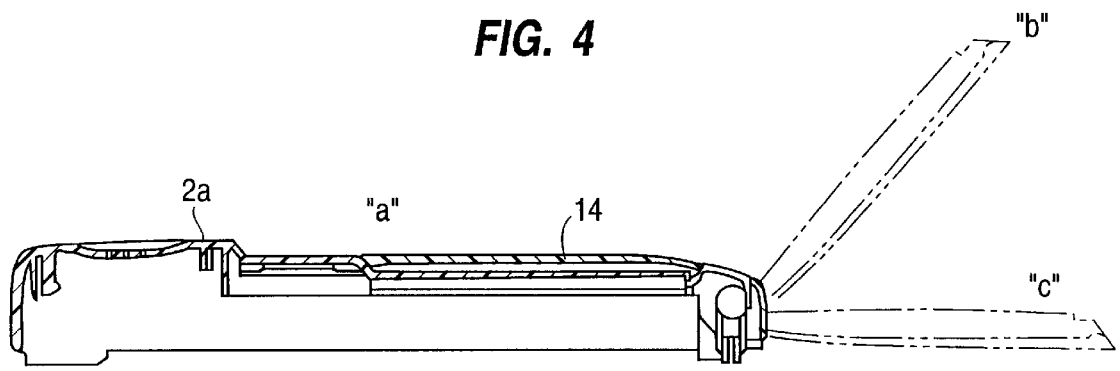
FIG. 4 is a vertical sectional view showing stepwise rotational positions of the cover rotatably mounted to an upper case.
Figure 5:
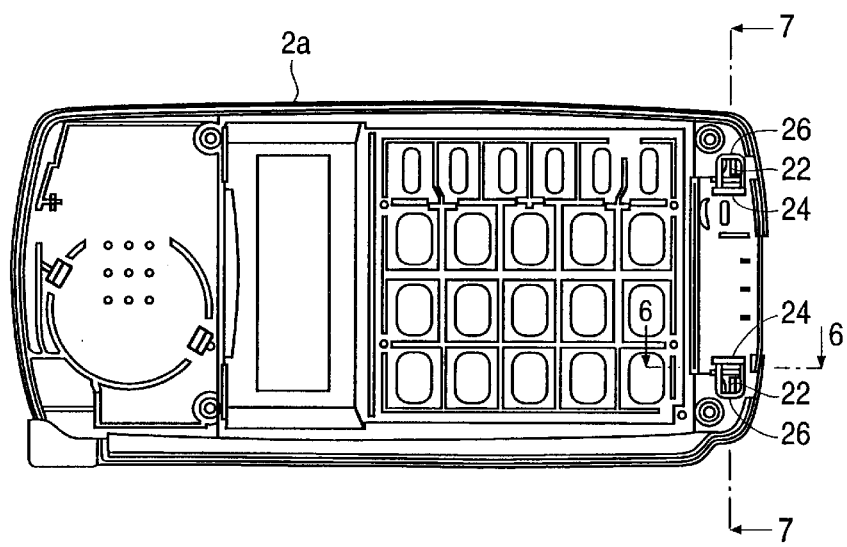
FIG. 5 is a bottom plan view of the upper case shown in FIG. 4 with the cover closed.

FIG. 4 shows such a rotatably mounted condition of the cover 14 with respect to the upper case 2a in vertical section, and FIG. 5 is a bottom plan view of FIG. 4.

The operation of the cover holding mechanism will now be described with reference to FIGS. 6A to 6C. In this preferred embodiment, a stable position of the cover 14 is a position "b" shown in FIG. 4 where the cover 14 is inclined at 145° with respect to the upper case 2a. In this stable position of the cover 14, each U-shaped spring 26 tightly contacts two opposite flat surfaces 25a of the angular plate portion 24c of each shaft 24 as shown in FIG. 6B. An inclined surface 25b is formed continuously from one end of each flat surface 25a, so as to permit smooth rotation of the cover 14.

Figure 6A:
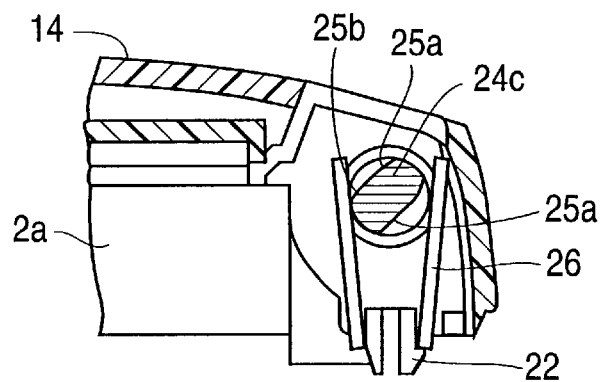
FIGS. 6A, 6B and 6C are cross sections taken along the lines 6—6 in FIG. 5, corresponding to cover positions "a", "b" and "c" shown in FIG. 4.
Figure 6B:
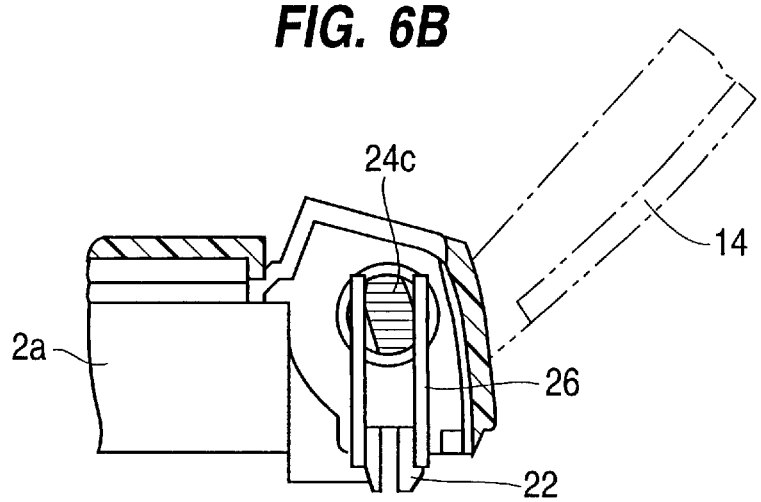

FIG. 6A shows a closed condition of the cover 14, which corresponds to a position "a" shown in FIG. 4. In this condition, the U-shaped springs 26 operate to press the cover 14 against the upper case 2a through the angular plate portions 24c of the shafts 24. Accordingly, it is not necessary to provide a lock mechanism for maintaining a closed condition of the cover 14, and the operability in practical use can be improved.

Figure 6C:
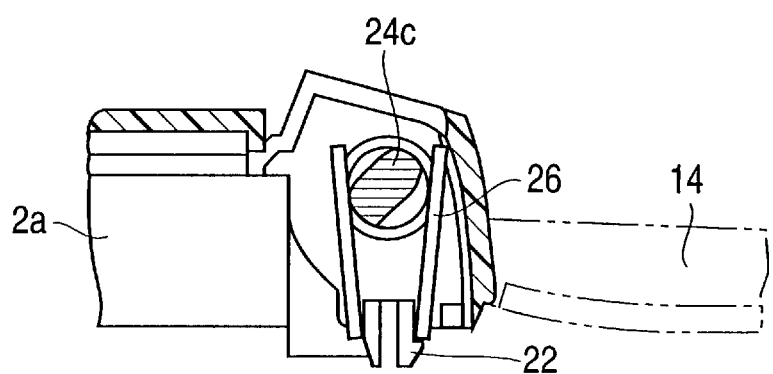

FIG. 6C shows a fully open condition of the cover 14 obtained against a biasing force of the U-shaped springs 26, which corresponds to a position "c" shown in FIG. 4. In this condition, the U-shaped springs 26 exert a biasing force in a closing direction of the cover 14 through the angular plate portions 24c of the shafts 24, so that the cover 14 is resiliently retained. Accordingly, in an exemplary case such that the portable telephone with the cover 14 open is put on a flat surface such as a desk surface under the condition where the switch section 8 faces the flat surface, and that a load is applied to the portable telephone from the side of the lower case 2b, the cover 14 is rotated to become the condition of FIG. 6C against the biasing force of the U-shaped springs 26, thus obviating a possibility of breakage of the cover 14. In this preferred embodiment, an angle defined between the flat surface 25a of the angular plate portion 24c of each shaft 24 and the cover 14 is set to 55°, so that the cover 14 is stably held in open position inclined at 145° with respect to the upper case 2a.

While a single stable position of the cover 14 is set by forming the angular plate portion 24c in the vicinity of one end of each shaft 24 in this preferred embodiment, a plurality of stabilizer points may be set by forming a portion of each shaft 24 in the vicinity of one end thereof into a polygonal sectional shape. In this preferred embodiment, the stable position of the cover 14 is set in a position where the cover 14 is inclined at 145° with respect to the upper case 2a because an S/N characteristic in the transmitter section 10 becomes maximum during the telephonic communication.

Figure 7:
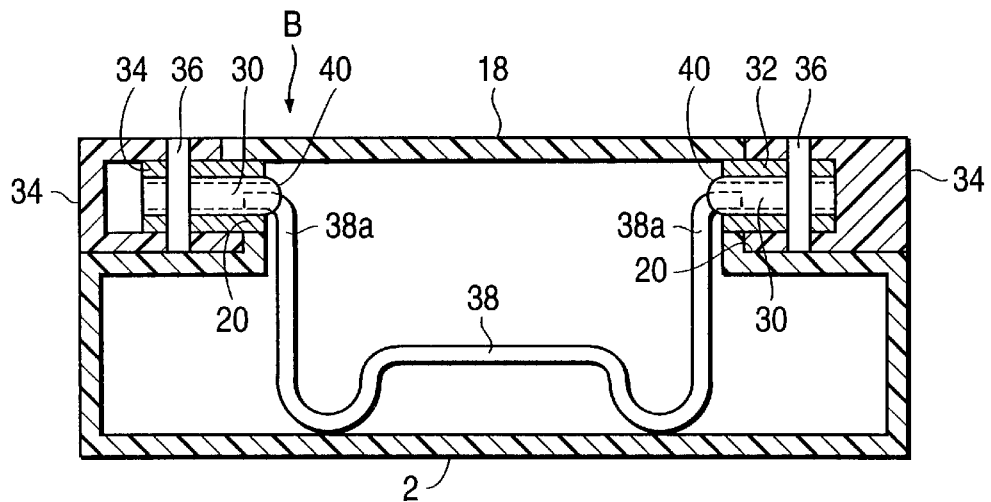
FIG. 7 is a vertical sectional view showing a second preferred embodiment of a cover holding mechanism according to the present invention.

FIG. 7 is a vertical sectional view of a second preferred embodiment of the cover holding mechanism according to the present invention, in which a sectional position corresponds to the line 7—7 in FIG. 5. A pair of cylindrical members 32 are rotatably inserted through the circular holes 20 of the mounting projection 18 of the case 2. A pipe shaft 30 is fixedly inserted in each cylindrical member 32. The pipe shaft 30 is formed at its inner end with a wave cam 40. The pair of cylindrical members 32 are fixedly inserted in a pair of mounting portions 34 of the cover 14, respectively. A pair of pins 36 are fixedly inserted through the mounting portions 34 of the cover 14, the cylindrical members 32 and the pipe shafts 30 in a radial direction thereof, so as to prevent relative rotation of the pipe shafts 30, the cylindrical members 32 and the mounting portions 34 of the cover 14. A spring member 38 formed of an elastic metal is non-rotatably provided within the case 2. Opposite ends of the spring member 38 are inserted in the pipe shafts 30, respectively. A pair of L-shaped bent portions 38a are formed in the vicinity of the opposite ends of the spring member 38, and they are engaged with the wave cams 40 of the pipe shafts 30, respectively.

When each L-shaped bent portion 38a of the spring member 38 is in positions where it is seated in trough portions of the corresponding wave cam 40, the spring member 38 is not elastically deformed, and a biasing force of the spring member 38 is therefore not applied to the pipe shafts 30. On the other hand, when each L-shaped bent portion 38a of the spring member 38 is in contact with the vicinity of crest portions of the corresponding wave cam 40, the spring member 38 is elastically deformed in such a manner that the L-shaped bent portions 38a are urged inwardly to the center of the spring member 38 in FIG. 7, and the biasing force of the spring member 38 due to such elastic deformation is applied to the pipe shafts 30.

Figure 8:
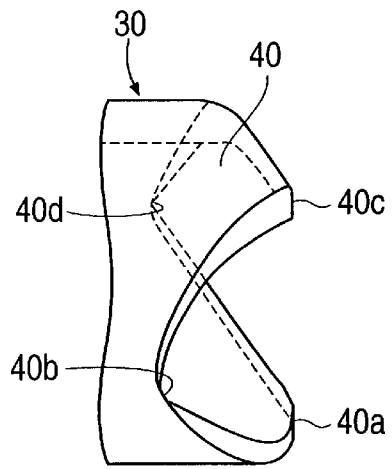
FIG. 8 is an enlarged view of a wave cam taken in the direction of arrow B shown in FIG. 7.
Figure 9:
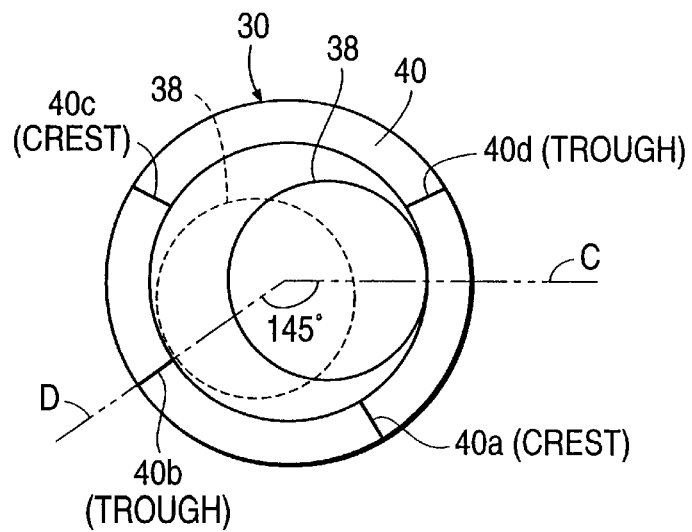
FIG. 9 is a front elevational view of the wave cam shown in FIG. 8.

FIG. 8 is an enlarged view of the wave cam 40 taken in a direction of arrow B shown in FIG. 7, and FIG. 9 is a front elevation of the wave cam 40 shown in FIG. 8. The wave cam 40 has the crest portion 40a, the trough portion 40b, the crest portion 40c, and the trough portion 40d formed circumferentially in this order. When each L-shaped bent portion 38a of the spring member 38 is seated in the trough portion 40b of the corresponding wave cam 40 as shown by a dashed line in FIG. 9, the cover 14 is maintained in a stable position where a plane D parallel to the cover 14 is inclined at 145° with respect to a plane C parallel to the case 2. On the other hand, when each L-shaped bent portion 38a of the spring member 38 lies on the plane C as shown in a solid line in FIG. 9, that is, when the cover 14 is in a closed condition, each L-shaped bent portion 38a of the spring member 38 is in contact with a portion of the wave cam 40 at a position between the crest portion 40a and the trough portion 40d. Accordingly, the biasing force of the spring member 38 is applied in a closing direction of the cover 14 through the wave cams 40.

Similarly to the first preferred embodiment, the second preferred embodiment can provide a portable telephone which can obviate a possibility of breakage of the cover and improve the operability in practical use. According to the first and second preferred embodiments, as the cover 14 in the open position also serves as a voice reflecting and collecting board during the telephonic communication, the S/N characteristic in the transmitter section can be improved. Accordingly, the portable telephone can be made compact by reducing the distance between the transmitter section and the receiver section.

According to the present invention, the cover is rotatably mounted to the case of the portable telephone by the cover holding mechanism. Accordingly, when the cover is closed, the switch section of the portable telephone can be protected by the cover. Further, when the cover is opened, the cover can be stably held in position at a predetermined inclined angle (e.g. 145°) with respect to the case. Accordingly, the cover can be utilized as a voice reflecting and collecting board, thereby improving the S/N characteristic in the transmitter section. Thus, the portable telephone of the present invention can improve the S/N characteristic will still having a compact size.

What is claimed is:

1. A portable telephone comprising:

a body having a width and including a speaker, a microphone and switch means;

a cover rotatably mounted at one end to said body to be moveable between open and closed conditions, said cover having a top cover and a pair of opposed side covers extending generally perpendicular to said top cover, said opposed side covers and said top cover forming a shallow hollow portion in an inside face of said cover, said hollow portion covering part of said switch means when said cover is in the closed condition, said cover having a width which is generally equal to or smaller than the width of said body;

a pair of opposed gripping projections respectively extending laterally outwardly from said side covers, at a position away from said rotatably mounted ends, for facilitating movement of said cover between the open and closed conditions; and cover holding means for rotatably holding said cover with respect to said body, said cover holding means including biasing means for exerting a biasing force to said cover so as to resiliently maintain said cover at a stable position in a rotational direction when said cover is in the open condition and to press said cover to said body when said cover is in a closed condition, said cover being inclined at a predetermined angle with respect to said body when said cover is in said stable position; and wherein said microphone is provided in said body at a position adjacent said cover holding means and said cover functions as a voice reflecting and collecting board for said microphone when said cover is in said open condition.

2. A portable telephone according to claim 1, wherein said cover holding means comprises a cover mounting projection integrally formed with said body and having a hole; a shaft rotatably inserted through said hole, said shaft having an end portion fixed to said cover and a plate portion with flat sides; and a spring fixed to the cover mounting projection of said body so as to nip said plate portion of said shaft.

3. A portable telephone according to claim 1, wherein said cover has a length and the pair of opposed gripping projections extend outwardly from said side covers in a direction along the length of the cover.

* * * * *